(12) United States Patent
Xie et al.

(10) Patent No.: US 10,990,303 B2
(45) Date of Patent: *Apr. 27, 2021

(54) MEMORY ALLOCATION METHOD AND APPARATUS

(71) Applicant: HUAWEI TECHNOLOGIES CO., LTD., Guangdong (CN)

(72) Inventors: Xiuqi Xie, Hangzhou (CN); Xishi Qiu, Shenzhen (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 64 days.

This patent is subject to a terminal disclaimer.

(21) Appl. No.: 16/425,872

(22) Filed: May 29, 2019

(65) Prior Publication Data

US 2019/0278499 A1  Sep. 12, 2019

Related U.S. Application Data

(63) Continuation of application No. 15/460,132, filed on Mar. 15, 2017, now Pat. No. 10,353,609, which is a
(Continued)

(30) Foreign Application Priority Data

Sep. 16, 2014 (CN) .......................... 201410471145.X (51) Int. Cl.
*G06F 3/06* (2006.01)
*G06F 12/02* (2006.01)
(Continued)

(52) U.S. Cl.
CPC .......... *G06F 3/0631* (2013.01); *G06F 3/0604* (2013.01); *G06F 3/0673* (2013.01);
(Continued)

(58) Field of Classification Search
CPC .... G06F 3/0604; G06F 3/0605; G06F 3/0631; G06F 3/0665; G06F 3/0671;
(Continued)

(56) References Cited

U.S. PATENT DOCUMENTS 5,651,133 A   7/1997   Burkes et al.
8,601,310 B2  12/2013  Dreier
(Continued)

FOREIGN PATENT DOCUMENTS

CN   101470667 A   7/2009
CN   101604263 A   12/2009
(Continued)

OTHER PUBLICATIONS

Love, Robert, "Kernel Korner—Allocating Memory in the Kernel", Linux Journal, 6 pages, Dec. 1, 2003, 10 pages.
(Continued)

*Primary Examiner* — Gary J Portka
(74) *Attorney, Agent, or Firm* — Womble Bond Dickinson (US) LLP (57) ABSTRACT

A memory allocation method and apparatus is disclosed. The method includes: obtaining unoccupied mirrored memory in an initial mirrored memory, where the initial mirrored memory is indicated by a mirrored memory address range that is provided by an BIOS of a computer system to the an OS of the computer system during initialization of the OS; performing detection on data requiring memory allocation; and when detecting that the data is data to be stored in mirrored memory, allocating, from the unoccupied mirrored memory, the mirrored memory to the data to be stored in the mirrored memory. The memory allocation method can accurately find the mirrored memory, and allocating the mirrored memory to the data that needs to be stored in the mirrored
(Continued)

memory. Therefore, this method ensures usage efficiency of the limited mirrored memory.

9 Claims, 5 Drawing Sheets

Related U.S. Application Data continuation of application No. PCT/CN2015/089796, filed on Sep. 16, 2015.

(51) Int. Cl.
 *G06F 11/16* (2006.01)
 *G06F 11/14* (2006.01)
 *G06F 9/4401* (2018.01)

(52) U.S. Cl.
 CPC ............ *G06F 9/4406* (2013.01); *G06F 11/14* (2013.01); *G06F 11/1666* (2013.01); *G06F 12/02* (2013.01)

(58) Field of Classification Search
 CPC .. G06F 3/0673; G06F 9/4406; G06F 11/1666; G06F 12/02
 USPC .................................................. 711/162, 170
 See application file for complete search history.

(56) References Cited

U.S. PATENT DOCUMENTS

| | | | |
|---|---|---|---|
| 9,037,903 B2 | 5/2015 | Hum et al. | |
| 10,318,190 B2* | 6/2019 | McBride | G06F 12/0868 |
| 2002/0087816 A1 | 7/2002 | Atkinson et al. | |
| 2003/0208650 A1 | 11/2003 | Depew | G06F 11/1658 710/302 |
| 2005/0216552 A1 | 9/2005 | Fineberg et al. | |
| 2007/0214333 A1 | 9/2007 | Nijhawan et al. | |
| 2008/0140961 A1 | 6/2008 | Atherton et al. | |
| 2009/0006793 A1 | 1/2009 | Yamada et al. | |
| 2010/0115330 A1 | 5/2010 | Khatri et al. | |
| 2012/0047340 A1 | 2/2012 | Inaba | |
| 2012/0054543 A1 | 3/2012 | Dreier | |
| 2012/0079316 A1 | 3/2012 | Bulusu et al. | |
| 2012/0191900 A1 | 7/2012 | Kunimatsu et al. | |
| 2012/0297149 A1 | 11/2012 | Wang et al. | |
| 2013/0151767 A1 | 6/2013 | Berke et al. | |
| 2014/0189417 A1 | 7/2014 | Hum et al. | |
| 2014/0258669 A1 | 9/2014 | Wang et al. | |
| 2015/0154082 A1 | 6/2015 | Dasari | G06F 11/1666 711/162 |
| 2015/0154227 A1 | 6/2015 | Wang et al. | |

FOREIGN PATENT DOCUMENTS

| | | |
|---|---|---|
| CN | 101901174 A | 12/2010 |
| CN | 101937400 A | 1/2011 |
| CN | 102203737 A | 9/2011 |
| CN | 103136110 A | 6/2013 |
| CN | 103198028 A | 7/2013 |
| CN | 103324582 A | 9/2013 |
| CN | 103389884 A | 11/2013 |
| CN | 103530241 A | 1/2014 |
| CN | 104252419 A | 12/2014 |
| EP | 3171276 A1 | 5/2017 |
| JP | 2009-199478 A | 9/2009 |
| JP | 2009199478 A | 9/2009 |
| JP | 2011-186563 A | 9/2011 |
| JP | 2011186563 A | 9/2011 |
| JP | 2012-043246 A | 3/2012 |
| JP | 2012043246 A | 3/2012 |

OTHER PUBLICATIONS

Love, Robert, "Kernel Korner—Allocating Memory in the Kernel", www.linuxjournal.com/article/6930, 6 pages, Dec. 1, 2003.

* cited by examiner

MEMORY ALLOCATION METHOD AND APPARATUS

CROSS-REFERENCE TO RELATED APPLICATIONS

This application is a continuation of U.S. patent application Ser. No. 15/460,132, filed on Mar. 15, 2017, which is a continuation of International Application No. PCT/CN2015/089796, filed on Sep. 16, 2015, which claims the priority to Chinese Patent Application No. 201410471145.X, filed on Sep. 16, 2014. All of the afore-mentioned patent applications are hereby incorporated by reference in their entireties.

TECHNICAL FIELD

The present invention relates to the field of computer technologies, and in particular, to a memory allocation method and apparatus.

BACKGROUND

Memory reliability has great impact on reliability of a computer system. Therefore, memory reliability needs to be improved. Currently, memory mirroring is generally used in the prior art to improve memory reliability.

An operating principle of a memory mirroring technology is as follows: Two memory areas are planned in hardware. One is used as primary memory, and the other is used as mirrored memory. When running, an operating system makes two copies of data in memory, which are respectively stored in the primary memory and the mirrored memory. Therefore, for the data in the memory, there are two sets of complete backup data. Complete memory mirroring requires that there are copies for all data in memory. When a server system runs normally, an original is used. When a host of one copy fails, the other copy is used instead. In this way, a data loss caused by a memory channel fault is avoided effectively, and server reliability is improved greatly. However, double physical memory is needed for implementing this function, and actual capacity utilization is only 50%. Due to very high costs, actually, few products use complete memory mirroring.

In the prior art, a partial memory mirroring technology emerges. The technology may use a part of memory in a computer system (for example, an area of a segment or several segments of memory addresses) as mirrored memory. However, in the prior art, the mirrored memory resides only at a hardware layer, and the operating system is not aware of the hardware layer. When the mirrored memory in the hardware layer changes, the mirrored memory cannot be accurately found in the operating system, and consequently, data cannot be accurately stored in the mirrored memory. In addition, a size of the mirrored memory is limited. When allocating the mirrored memory to data, the computer system allocates the mirrored memory only to data that is first generated. After the mirrored memory is fully occupied, no mirrored memory can be allocated to other data that needs to be allocated mirrored memory.

SUMMARY

In comparison with the prior art in which an operating system cannot be aware of a change of mirrored memory and cannot allocate the mirrored memory to data that needs to be allocated the mirrored memory if a size of the mirrored memory is limited, a memory allocation method provided by an embodiment of the present invention can accurately find mirrored memory, and allocate the mirrored memory to data that needs to be stored in the mirrored memory. This method ensuring high utilization of the limited mirrored memory and improves system reliability. An embodiment of the present invention further provides a corresponding apparatus.

A first aspect of the present invention provides a memory allocation method, where the method is applied to a computer system, and the computer system includes a memory resource, a basic input/output system BIOS, and an operating system OS, where the memory resource includes initial mirrored memory, and when the operating system runs, the method includes:

obtaining unoccupied mirrored memory in the initial mirrored memory, where the initial mirrored memory is mirrored memory indicated by a mirrored memory address range that is provided by the BIOS to the OS during initialization of the OS;

performing detection on data requiring memory allocation; and when detecting that the data is data to be stored in mirrored memory, allocating, from the unoccupied mirrored memory, the mirrored memory to the data to be stored in the mirrored memory.

With reference to the first aspect, in a first possible implementation manner, before the performing detection on data requiring memory allocation, the method further includes:

setting a mirror identifier for kernel data and critical user data, where the critical user data is user-specified data requiring mirrored storage;

the performing detection on data requiring memory allocation includes:

detecting whether the data requiring memory allocation carries the mirror identifier; and the when detecting that the data is data to be stored in mirrored memory, allocating, from the unoccupied mirrored memory, the mirrored memory to the data to be stored in the mirrored memory, includes:

when detecting that the data requiring memory allocation carries the mirror identifier, determining that the data requiring memory allocation is the kernel data or the critical user data, and allocating, from the unoccupied mirrored memory, the mirrored memory to the kernel data or the critical user data.

With reference to the first possible implementation manner of the first aspect, in a second possible implementation manner, the method further includes:

when the data requiring memory allocation is the critical user data, determining whether data of a same process is stored in the initial mirrored memory, where the data of the same process is data generated before the critical user data by the same process that generates the critical user data; and if the data of the same process is not stored in the original mirrored memory, migrating the data of the same process to the initial mirrored memory.

With reference to the first aspect or the first or second possible implementation manner of the first aspect, in a third possible implementation manner, the allocating, from the unoccupied mirrored memory, the mirrored memory to the data to be stored in the mirrored memory, includes:

determining a preplanned memory resource area to which the data to be stored in the mirrored memory belongs; and allocating, from unoccupied mirrored memory of the preplanned memory resource area to which the data belongs, the mirrored memory to the data to be stored in the mirrored memory.

With reference to the first aspect or the first or second possible implementation manner of the first aspect, in a fourth possible implementation manner, after the allocating, from the unoccupied mirrored memory, the mirrored memory to the data to be stored in the mirrored memory, the method further includes:

setting an occupancy flag for an address range of the mirrored memory that is allocated to the data to be stored in the mirrored memory.

A second aspect of the present invention provides a memory allocation apparatus, where the apparatus is applied to a computer system, and the computer system includes a memory resource, a basic input/output system BIOS, and an operating system OS, where the memory resource includes initial mirrored memory, and when the operating system runs, the apparatus includes:

an obtaining unit, configured to obtain unoccupied mirrored memory in the initial mirrored memory, where the initial mirrored memory is mirrored memory indicated by a mirrored memory address range that is provided by the BIOS to the OS during initialization of the OS;

a detection unit, configured to perform detection on data requiring memory allocation; and an allocation unit, configured to allocate, from the unoccupied mirrored memory obtained by the obtaining unit, when the detection unit detects that the data is data to be stored in mirrored memory, the mirrored memory to the data to be stored in the mirrored memory.

With reference to the second aspect, in a first possible implementation manner, the apparatus further includes:

a first setting unit, configured to set a mirror identifier for kernel data and critical user data before the detection unit performs detection on the data requiring memory allocation, where the critical user data is user-specified data requiring mirrored storage; where the detection unit is configured to detect whether the data requiring memory allocation carries the mirror identifier set by the first setting unit; and the allocation unit is configured to determine, when the detection unit detects that the data requiring memory allocation carries the mirror identifier, that the data requiring memory allocation is the kernel data or the critical user data, and allocate, from the unoccupied mirrored memory, the mirrored memory to the kernel data or the critical user data.

With reference to the first possible implementation manner of the second aspect, in a second possible implementation manner, the apparatus further includes:

a determining unit, configured to determine, when the data requiring memory allocation is the critical user data, whether data of a same process is stored in the initial mirrored memory, where the data of the same process is data generated before the critical user data by the same process that generates the critical user data; and a migration unit, configured to migrate the data of the same process to the initial mirrored memory when the determining unit determines that the data of the same process is not stored in the mirrored memory.

With reference to the second aspect or the first or second possible implementation manner of the second aspect, in a third possible implementation manner, the allocation unit includes:

a determining subunit, configured to determine a preplanned memory resource area to which the data to be stored in the mirrored memory belongs; and an allocation subunit, configured to allocate, from unoccupied mirrored memory of the preplanned memory resource area that is determined by the determining subunit and to which the data belongs, the mirrored memory to the data to be stored in the mirrored memory.

With reference to the second aspect or the first or second possible implementation manner of the second aspect, in a fourth possible implementation manner, the apparatus further includes:

a second setting unit, configured to set, after the allocation unit allocates the mirrored memory, an occupancy flag for an address range of the mirrored memory that is allocated to the data to be stored in the mirrored memory.

An embodiment of the present invention provides a memory allocation method. The method is applied to a computer system, and the computer system includes a memory resource, a basic input/output system BIOS, and an operating system OS, where the memory resource includes initial mirrored memory. When the operating system runs, the method includes: obtaining unoccupied mirrored memory in the initial mirrored memory, where the initial mirrored memory is mirrored memory indicated by a mirrored memory address range that is provided by the BIOS to the OS during initialization of the OS; performing detection on data requiring memory allocation; and when detecting that the data is data to be stored in mirrored memory, allocating, from the unoccupied mirrored memory, the mirrored memory to the data to be stored in the mirrored memory. In comparison with the prior art in which an operating system cannot be aware of a change of memory and cannot allocate the mirrored memory to data that needs to be allocated the mirrored memory if a size of the mirrored memory is limited, in the memory allocation method provided by this embodiment of the present invention, because the BIOS provides the mirrored memory address range to the OS, the method can accurately find the mirrored memory, and allocate the mirrored memory to the data that needs to be stored in the mirrored memory. Therefore, this method ensures usage efficiency of the limited mirrored memory and improves system reliability.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

An embodiment of the present invention provides a memory allocation method, which can accurately find mirrored memory, and allocate the mirrored memory to data that needs to be stored in the mirrored memory. Therefore, this method ensures usage efficiency of the limited mirrored memory and improves system reliability. An embodiment of the present invention further provides a corresponding apparatus and a system. Detailed descriptions are hereinafter provided separately.

To make a person skilled in the art understand the technical solutions in the present invention better, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
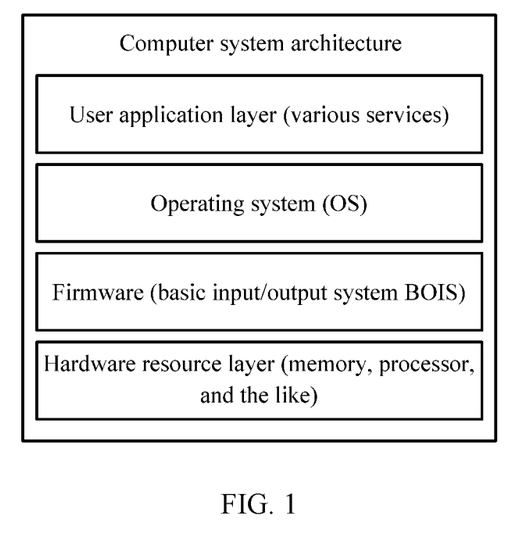
FIG. 1 is a schematic diagram of an architecture of a computer system according to an embodiment of the present invention.

Referring to FIG. 1, an architecture of a computer system provided by an embodiment of the present invention may include a hardware resource layer, a basic input/output system (Basic Input Output System, BIOS), an operating system (Operating System, OS), and a user application layer. The hardware resource layer may include hardware resources such as a processor, memory, and an input/output system. The user application layer may include various service applications. The operating system in this embodiment of the present invention may be a Linux system.

The memory may include mirrored memory. During initialization of the operating system, the BIOS reports memory information to the OS. The memory information may be address ranges of memory of various types, including an address range of mirrored memory. For example, the following information may be included, and may be expressed in a form of an e820 map:

e820: BIOS-provided physical RAM map:
[mem 0x0000000000000000-0x000000000009a7ff] usable
[mem 0x000000000009a800-0x000000000009ffff] reserved
[mem 0x00000000000e4b60-0x00000000000fffff] reserved
[mem 0x0000000000100000-0x000000003fffffff] mirror (1 MB to 1 GB)
[mem 0x0000000040000000-0x00000000bf78ffff] usable (1 GB to 3063 MB)
[mem 0x00000000bf790000-0x00000000bf79dfff] ACPI data
[mem 0x00000000bf79e000-0x00000000bf7cffff] ACPI NVS
[mem 0x00000000bf7d0000-0x00000000bf7dffff] reserved
[mem 0x00000000bf7ec000-0x00000000bfffffff] reserved
[mem 0x00000000e0000000-0x00000000efffffff] reserved
[mem 0x00000000fee00000-0x00000000fee00fff] reserved
[mem 0x00000000fff00000-0x00000000ffffffff] reserved
[mem 0x0000000100000000-0x00000002ffffffff] usable (4 GB to 12 GB)
[mem 0x0000000300000000-0x000000033fffffff] mirror (12 GB to 13 GB)
[mem 0x0000000340000000-0x00000005ffffffff] usable (13 GB to 24 GB)
[mem 0x0000000600000000-0x000000063fffffff] mirror (24 GB to 25 GB)
[mem 0x0000000640000000-0x00000008bfffffff] usable (25 GB to 36 GB)
[mem 0x0000000900000000-0x000000093fffffff] mirror (36 GB to 37 GB)
[mem 0x0000000940000000-0x0000000c3fffffff] usable (37 GB to 48 GB) . . . .

Memory corresponding to address ranges marked with mirrors is mirrored memory. In this embodiment of the present invention, the address ranges of the mirrored memory are (1M to 1 G), (12 G to 13 G), (24 G to 25 G), and (36 G to 37 G).

The operating system may create a mirrored memory management zone MIRROR ZONE according to the memory information reported by the BIOS. The MIRROR ZONE is used to track and manage mirrored memory areas, and its organization manner is the same as that of a normal memory management zone. There may be a plurality of MIRROR ZONEs, and the plurality of MIRROR ZONEs constitute a ZONE List. For example, for the mirrored memory in this embodiment of the present invention, there may be four MIRROR ZONEs: (1M to 1 G), (12 G to 13 G), (24 G to 25 G), and (36 G to 37 G), and may be sequentially numbered MIRROR_ZONE1, MIRROR_ZONE2, MIRROR_ZONE3, and MIRROR_ZONE4. According to a non-uniform memory access (Non Uniform Memory Access Architecture, NUMA) architecture, 48 GB memory may be partitioned into four nodes: (0M to 12 G), (13 G to 24 G), (25 G to 36 G), and (37 G to 48 G). The four MIRROR ZONEs respectively belong to the four nodes. During allocation of mirrored memory, mirrored memory of a local node is allocated preferentially, so that a long latency caused by inter-node memory access is avoided.

When memory is allocated to kernel data, a new _GFP_MIRROR identifier may be used as an identifier for preferentially allocating mirrored memory to a kernel. When memory is allocated to user data, a _GFP_MIRROR identifier may be specified for preferentially allocating mirrored memory; or the setting may be that mirrored memory is preferentially allocated to the kernel data by default. For example, a default value of GFP_KERNEL is changed, so that mirrored memory is preferentially allocated by default:
define GFP_KERNEL (_GFP_WAIT|_GFP_IO|_GFP_FS|_GFP_MIRROR)

A process of preferentially allocating mirrored memory to kernel data is as follows:

(1) When started, the OS determines whether a feature of preferentially allocating mirrored memory is supported (if there is memory of a MIRROR type in a memory distribution diagram reported by the BIOS, it indicates that the feature is supported).

(2) If the feature is supported, the OS creates one or more MIRROR ZONEs according to memory information reported by the BIOS, and adds the one or more MIRROR ZONEs to a ZONE list of all nodes, so that each node can choose to perform memory allocation in the MIRROR ZONE.

(3) alloc_pages( ) is a most basic page allocator, and all memory allocation is finally completed by the page allocator. The page allocator is responsible for allocating one or more (integral power of 2) continuous pages in a specified page zone (ZONE). For example, if a _GFP_MIRROR identifier is set, memory is preferentially allocated from the MIRROR ZONE.

(4) During memory allocation, memory is preferentially allocated from the MIRROR ZONE. If the memory of the MIRROR type is insufficient, memory is allocated from a normal zone.

(5) If an amount of mirrored memory in the system is excessively small and insufficient for storing all kernel data, the setting of allocating mirrored memory may be disabled by default, and changed to manual allocation of mirrored memory. For example, for some important drivers that have higher reliability requirements, a _GFP_MIRROR identifier may be specified manually during memory allocation.

(6) When released after use, the mirrored memory is released to the corresponding MIRROR ZONE.

In this embodiment of the present invention, this feature can be used without changing interfaces and use manners of memory allocation functions such as alloc_pages( ) and without modifying numerous existing drivers.

Preferentially allocating mirrored memory to data of a user process

For a new process:

(1) A process is created.

(2) A process descriptor is modified, and a mirrored memory allocation identifier MIRROR_FIRST is set in the processor descriptor. In the present invention, this identifier may be set by using a system call or a user mode command.

(3) During memory allocation, if MIRROR_FIRST is set, mirrored memory is preferentially used, and memory is preferentially allocated from a MIRROR ZONE. Otherwise, normal memory is used, and memory is allocated from a NORMAL ZONE. If mirrored memory is insufficient, normal memory is allocated.

(4) When a subprocess is created, the setting of the MIRROR_FIRST identifier is inherited by default.

For a running process:

(1) A MIRROR_FIRST identifier of the process is set by using a /proc interface or a system call, so that during memory allocation of the process, mirrored memory is allocated preferentially.

(2) Meanwhile, data in previously allocated normal memory is migrated to the mirrored memory.

Figure 2:
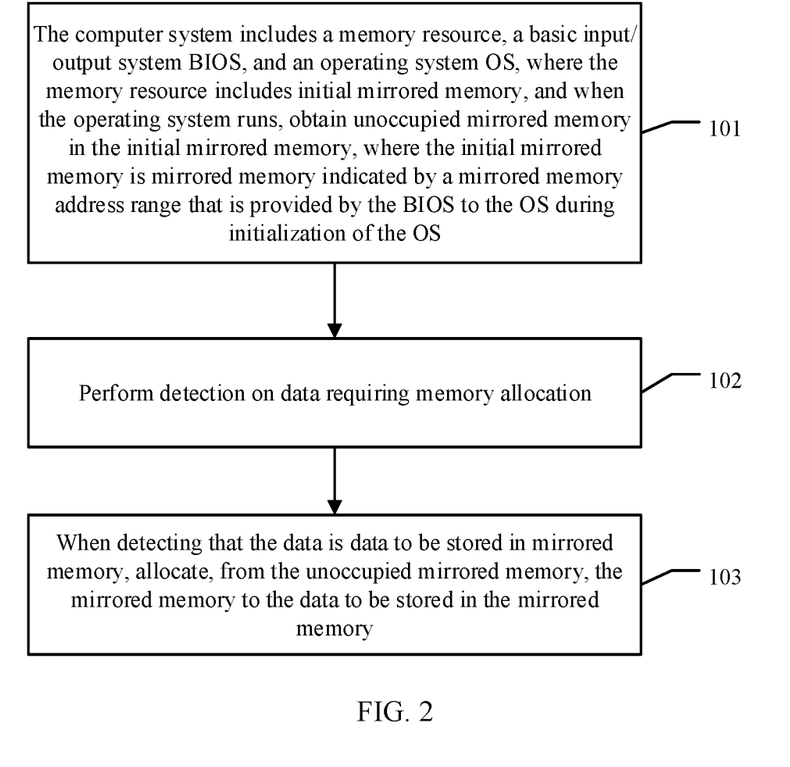
FIG. 2 is a schematic diagram of a memory allocation method according to an embodiment of the present invention.

Referring to FIG. 2, an embodiment of the present invention provides a memory allocation method.

The method is applied to a computer system, and the computer system includes a memory resource, a basic input/output system BIOS, and an operating system OS, where the memory resource includes initial mirrored memory. When the operating system runs, the method includes:

101. Obtain unoccupied mirrored memory in the initial mirrored memory, where the initial mirrored memory is mirrored memory indicated by a mirrored memory address range that is provided by the BIOS to the OS during initialization of the OS.

102. Perform detection on data requiring memory allocation.

103. When detecting that the data is data to be stored in mirrored memory, allocate, from the unoccupied mirrored memory, the mirrored memory to the data to be stored in the mirrored memory.

This embodiment of the present invention provides a memory allocation method. The method is applied to a computer system, and the computer system includes a memory resource, a basic input/output system BIOS, and an operating system OS, where the memory resource includes initial mirrored memory. When the operating system runs, the method includes: obtaining unoccupied mirrored memory in the initial mirrored memory, where the initial mirrored memory is mirrored memory indicated by a mirrored memory address range that is provided by the BIOS to the OS during initialization of the OS; performing detection on data requiring memory allocation; and when detecting that the data is data to be stored in mirrored memory, allocating, from the unoccupied mirrored memory, the mirrored memory to the data to be stored in the mirrored memory. In comparison with the prior art in which an operating system cannot be aware of a change of memory and cannot allocate the mirrored memory to data that needs to be allocated the mirrored memory if a size of the mirrored memory is limited, in the memory allocation method provided by this embodiment of the present invention, because the BIOS provides the mirrored memory address range to the OS, the method can accurately find the mirrored memory, and allocate the mirrored memory to the data that needs to be stored in the mirrored memory. Therefore, this method ensures usage efficiency of the limited mirrored memory and improves system reliability.

Optionally, on a basis of the embodiment corresponding to FIG. 2, in a first optional implementation manner of the memory allocation method provided by this embodiment of the present invention, before the performing detection on data requiring memory allocation, the method may further include:

setting a mirror identifier for kernel data and critical user data, where the critical user data is user-specified data requiring mirrored storage;

the performing detection on data requiring memory allocation may include:

detecting whether the data requiring memory allocation carries the mirror identifier; and the allocating, from the unoccupied mirrored memory, the mirrored memory to the data to be stored in the mirrored memory when detecting that the data is data to be stored in mirrored memory, may include:

when detecting that the data requiring memory allocation carries the mirror identifier, determining that the data requiring memory allocation is the kernel data or the critical user data, and allocating, from the unoccupied mirrored memory, the mirrored memory to the kernel data or the critical user data.

In this embodiment of the present invention, mirrored memory is allocated to all kernel data. For user data, settings may be performed according to a user's requirement. If the user specifies that a certain type of data is critical user data, a mirror identifier is set for this type of data, and mirrored memory is allocated to this type of data.

Optionally, on a basis of the first optional implementation manner, in a second optional implementation manner of the memory allocation method provided by this embodiment of the present invention, the method may further include:

when the data requiring memory allocation is the critical user data, determining whether data of a same process is stored in the initial mirrored memory, where the data of the same process is data generated before the critical user data by the same process that generates the critical user data; and if the data of the same process is not stored in the original mirrored memory, migrating the data of the same process to the initial mirrored memory.

This embodiment of the present invention is intended for a case in which a mirror flag is set for an ongoing process. For example, the user is editing a Word document. After a part of the document is edited, the user specifies that the Word document is critical user data. Therefore, for the edited part of data in this Word document, normal memory is allocated. For a part edited after the user specifies that the Word document is critical user data, mirrored memory is allocated. In this way, previous data in the normal memory may also be migrated to the mirrored memory.

Optionally, on a basis of the embodiment corresponding to FIG. 2 or any optional implementation manner, in a third optional implementation manner of the memory allocation method provided by this embodiment of the present invention, the allocating, from the unoccupied mirrored memory, the mirrored memory to the data to be stored in the mirrored memory, may include:

determining a preplanned memory resource area to which the data to be stored in the mirrored memory belongs; and allocating, from unoccupied mirrored memory of the preplanned memory resource area to which the data belongs, the mirrored memory to the data to be stored in the mirrored memory.

This embodiment of the present invention is intended for a case in which mirrored memory is distributed on different NUMA nodes. Mirrored memory is allocated within a local node, so that a long latency caused by inter-node memory access may be avoided.

Optionally, on a basis of the embodiment corresponding to FIG. 2 or any optional implementation manner, in a fourth optional implementation manner of the memory allocation method provided by this embodiment of the present invention, after the allocating, from the unoccupied mirrored memory, the mirrored memory to the data to be stored in the mirrored memory, the method may further include:

setting an occupancy flag for an address range of the mirrored memory that is allocated to the data to be stored in the mirrored memory.

In this embodiment of the present invention, after the mirrored memory is occupied, a flag is set for the address range of the occupied mirrored memory. In this way, when memory allocation is performed, unoccupied mirrored memory can be found quickly.

Figure 3:
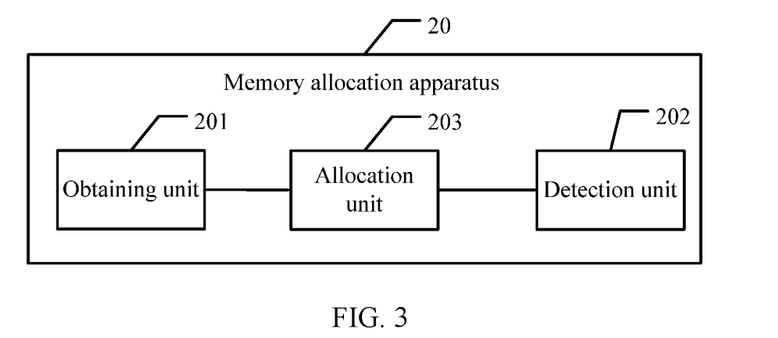
FIG. 3 is a schematic diagram of a memory allocation apparatus according to an embodiment of the present invention.

Referring to FIG. 3, n embodiment of the present invention provides a memory allocation apparatus 20. The apparatus is applied to a computer system, and the computer system includes a memory resource, a basic input/output system BIOS, and an operating system OS, where the memory resource includes initial mirrored memory. When the operating system runs, the apparatus 20 includes:

an obtaining unit 201, configured to obtain unoccupied mirrored memory in the initial mirrored memory, where the initial mirrored memory is mirrored memory indicated by a mirrored memory address range that is provided by the BIOS to the OS during initialization of the OS;

a detection unit 202, configured to perform detection on data requiring memory allocation; and an allocation unit 203, configured to allocate, from the unoccupied mirrored memory obtained by the obtaining unit 201, when the detection unit 202 detects that the data is data to be stored in mirrored memory, the mirrored memory to the data to be stored in the mirrored memory.

This embodiment of the present invention provides a memory allocation apparatus. The apparatus is applied to a computer system, and the computer system includes a memory resource, a basic input/output system BIOS, and an operating system OS, where the memory resource includes initial mirrored memory. When the operating system runs, the apparatus 20 includes: an obtaining unit 201 obtains unoccupied mirrored memory in the initial mirrored memory, where the initial mirrored memory is mirrored memory indicated by a mirrored memory address range that is provided by the BIOS to the OS during initialization of the OS; a detection unit 202 performs detection on data requiring memory allocation; and an allocation unit 203 allocates, from the unoccupied mirrored memory obtained by the obtaining unit 201, when the detection unit 202 detects that the data is data to be stored in mirrored memory, the mirrored memory to the data to be stored in the mirrored memory. In comparison with the prior art in which an operating system cannot be aware of a change of memory and cannot allocate the mirrored memory to data that needs to be allocated the mirrored memory if a size of the mirrored memory is limited, in the memory allocation apparatus provided by this embodiment of the present invention, because the BIOS provides the mirrored memory address range to the OS, the apparatus can accurately find the mirrored memory, and allocate the mirrored memory to the data that needs to be stored in the mirrored memory. Therefore, this method ensures usage efficiency of the limited mirrored memory and improves system reliability.

Figure 4:
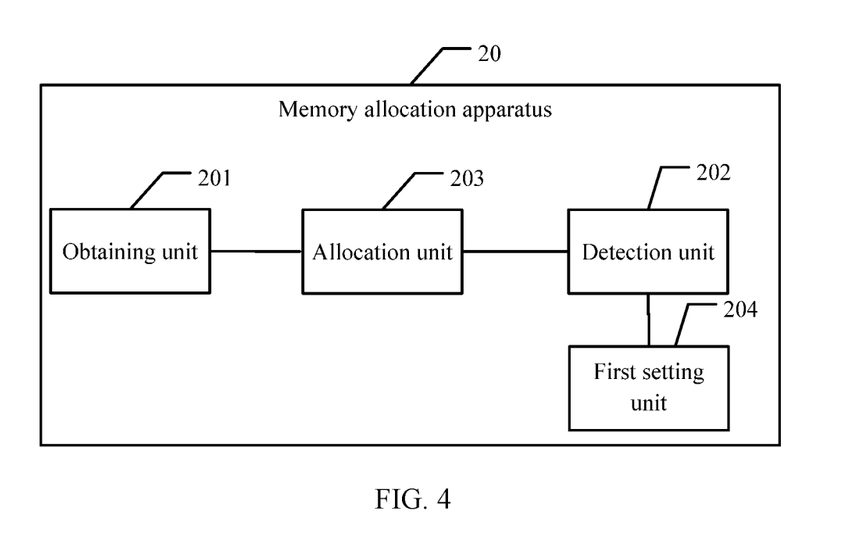
FIG. 4 is a schematic diagram of a memory allocation apparatus according to another embodiment of the present invention.

Optionally, on a basis of the embodiment corresponding to FIG. 3, referring to FIG. 4, in another implementation manner of the memory allocation apparatus provided by this embodiment of the present invention, the apparatus 20 further includes:

a first setting unit 204, configured to set a mirror identifier for kernel data and critical user data before the detection unit 202 performs detection on the data requiring memory allocation, where the critical user data is user-specified data requiring mirrored storage; where the detection unit 202 is configured to detect whether the data requiring memory allocation carries the mirror identifier set by the first setting unit 204; and the allocation unit 203 is configured to determine, when the detection unit 202 detects that the data requiring memory allocation carries the mirror identifier, that the data requiring memory allocation is the kernel data or the critical user data, and allocate, from the unoccupied mirrored memory, the mirrored memory to the kernel data or the critical user data.

Figure 5:
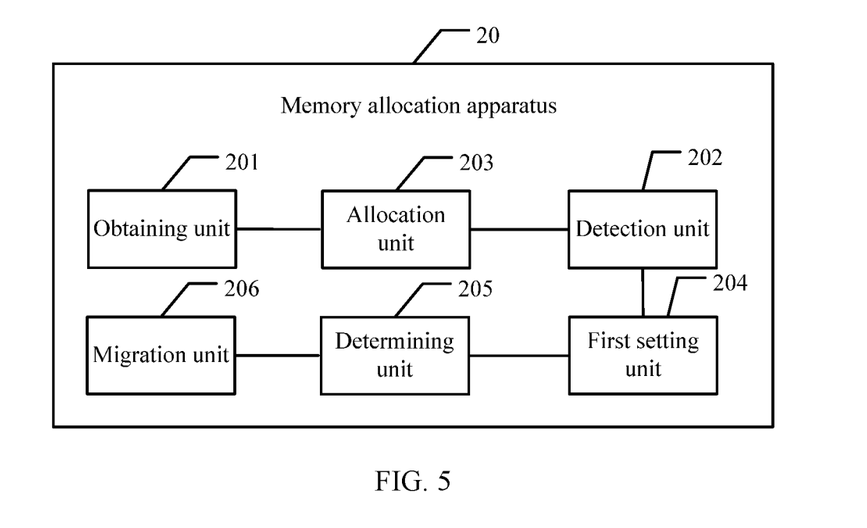
FIG. 5 is a schematic diagram of a memory allocation apparatus according to another embodiment of the present invention.

Optionally, on a basis of the embodiment corresponding to FIG. 4, referring to FIG. 5, in another implementation manner of the memory allocation apparatus provided by this embodiment of the present invention, the apparatus 20 further includes:

a determining unit 205, configured to determine, when the data requiring memory allocation is the critical user data set by the first setting unit 204, whether data of a same process is stored in the initial mirrored memory, where the data of the same process is data generated before the critical user data by the same process that generates the critical user data; and a migration unit 206, configured to migrate the data of the same process to the initial mirrored memory when the determining unit 205 determines that the data of the same process is not stored in the mirrored memory.

Figure 6:
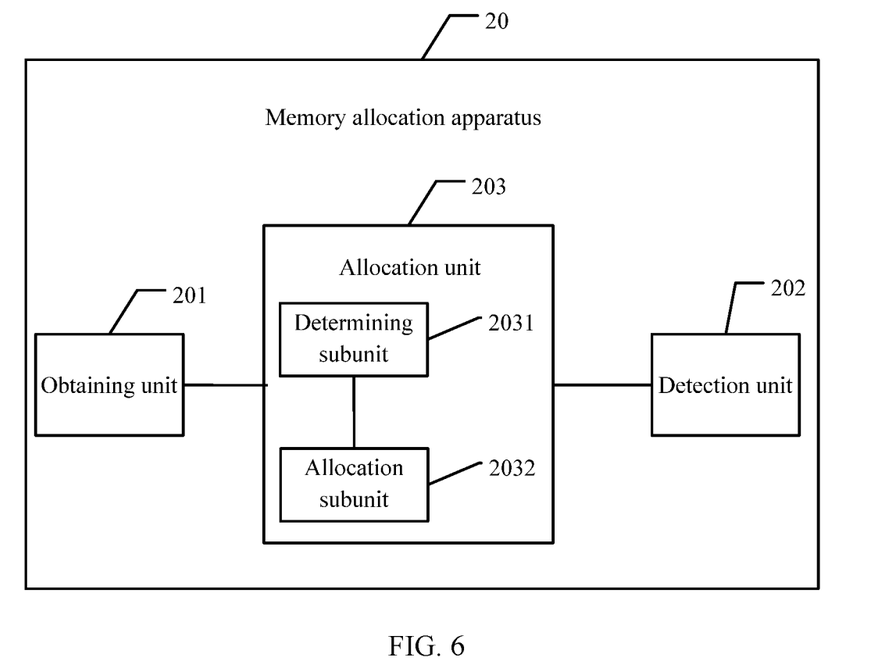
FIG. 6 is a schematic diagram of a memory allocation apparatus according to another embodiment of the present invention.

Optionally, on a basis of the embodiment corresponding to FIG. 3, referring to FIG. 6, in another implementation manner of the memory allocation apparatus provided by this embodiment of the present invention, the allocation unit 203 includes:

a determining subunit 2031, configured to determine a preplanned memory resource area to which the data to be stored in the mirrored memory belongs; and an allocation subunit 2032, configured to allocate, from unoccupied mirrored memory of the preplanned memory resource area that is determined by the determining subunit 2031 and to which the data belongs, the mirrored memory to the data to be stored in the mirrored memory.

Figure 7:
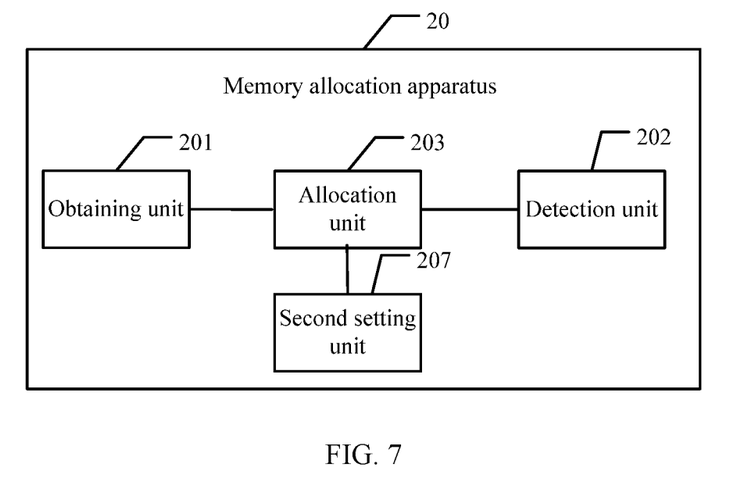
FIG. 7 is a schematic diagram of a memory allocation apparatus according to another embodiment of the present invention.

Optionally, on a basis of the embodiment corresponding to FIG. 3, referring to FIG. 7, in another implementation manner of the memory allocation apparatus provided by this embodiment of the present invention, the apparatus 20 further includes:

a second setting unit 207, configured to set, after the allocation unit 203 allocates the mirrored memory, an occupancy flag for an address range of the mirrored memory that is allocated to the data to be stored in the mirrored memory.

Figure 8:
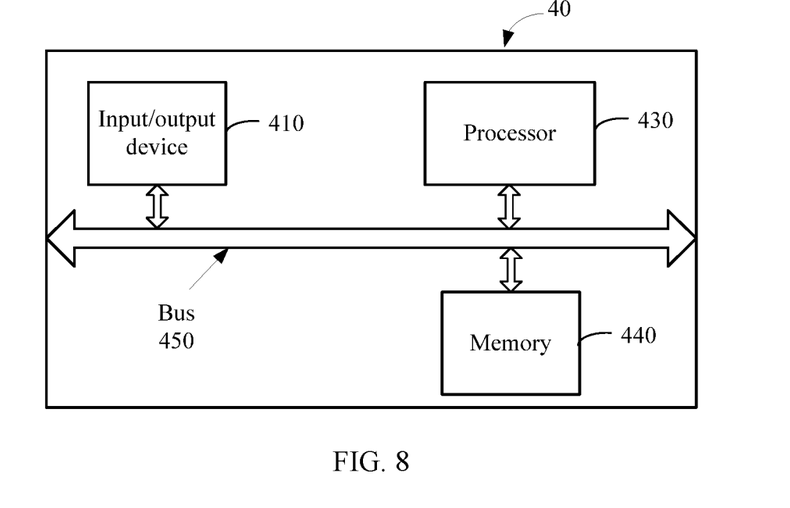
FIG. 8 is a schematic diagram of a memory allocation device according to an embodiment of the present invention.

FIG. 8 is a schematic structural diagram of a memory allocation device 40 according to an embodiment of the present invention. The memory allocation device 40 may include an input/output device 410, a processor 430, and a memory 440.

The memory 440 may include a read-only memory and a random access memory, and provide an instruction and data to the processor 430. A part of the memory 440 may further include a non-volatile random access memory (NVRAM).

The memory 440 stores the following elements, executable modules or data structures, or their subsets, or their extension sets:

operation instructions, including various operation instructions, used to perform various operations; and an operating system, including various system programs, used to implement various basic services and process hardware-based tasks.

The memory allocation device is applied to a computer system, and the computer system includes a memory resource, a basic input/output system BIOS, and an operating system OS, where the memory resource includes initial mirrored memory. In this embodiment of the present invention, when the operating system runs, the processor 430 performs the following operations by invoking an operation instruction stored in the memory 440 (the operation instruction may be stored in the operating system):

obtaining unoccupied mirrored memory in the initial mirrored memory, where the initial mirrored memory is mirrored memory indicated by a mirrored memory address range that is provided by the BIOS to the OS during initialization of the OS;

performing detection on data requiring memory allocation; and when detecting that the data is data to be stored in mirrored memory, allocating, from the unoccupied mirrored memory, the mirrored memory to the data to be stored in the mirrored memory.

In this embodiment of the present invention, the BIOS of the memory allocation device 40 provides a mirrored memory address range to the OS, so that mirrored memory can be found accurately. In addition, mirrored memory is allocated to data that needs to be stored in the mirrored memory, so that usage efficiency of the limited mirrored memory is ensured and that system reliability is improved.

The processor 430 controls an operation of the memory allocation device 40. The processor 430 may also be referred to as a CPU (Central Processing Unit, central processing unit). The memory 440 may include a read-only memory and a random access memory, and provide an instruction and data to the processor 430. A part of the memory 440 may further include a non-volatile random access memory (NVRAM). In a specific application, components of the memory allocation device 40 are coupled together by using a bus system 450. The bus system 450 may further include a power bus, a control bus, a status signal bus, and the like, in addition to a data bus. However, for clear description, various buses in the figure are marked as the bus system 450.

The methods disclosed by the foregoing embodiments of the present invention may be applied to the processor 430 or implemented by the processor 430. The processor 430 may be an integrated circuit chip and have a signal processing capability. In an implementation process, each step of the foregoing methods may be completed by using an integrated logic circuit of hardware in the processor 430 or an instruction in a form of software. The processor 430 may be a general purpose processor, a digital signal processor (DSP), an application-specific integrated circuit (ASIC), a field programmable gate array (FPGA), or another programmable logic device, discrete gate or transistor logic device, or discrete hardware component. The processor may implement or execute methods, steps and logic block diagrams disclosed in the embodiments of the present invention. The general purpose processor may be a microprocessor or the processor may be any conventional processor or the like. Steps of the methods disclosed with reference to the embodiments of the present invention may be directly executed and completed by means of a hardware decoding processor, or may be executed and completed by using a combination of hardware and software modules in a decoding processor. The software modules may be located in a mature storage medium in the art, such as a random access memory, a flash memory, a read-only memory, a programmable read-only memory, an electrically-erasable programmable memory, or a register. The storage medium is located in the memory 440, and the processor 430 reads information in the memory 440 and completes the steps in the foregoing methods in combination with hardware of the processor.

Optionally, the processor 430 is further configured to: set a mirror identifier for kernel data and critical user data, where the critical user data is user-specified data requiring mirrored storage; detect whether the data requiring memory allocation carries the mirror identifier; and when detecting that the data requiring memory allocation carries the mirror identifier, determine that the data requiring memory allocation is the kernel data or the critical user data, and allocate, from the unoccupied mirrored memory, the mirrored memory to the kernel data or the critical user data.

Optionally, the processor 430 is further configured to: when the data requiring memory allocation is the critical user data, determine whether data of a same process is stored in the initial mirrored memory, where the data of the same process is data generated before the critical user data by the same process that generates the critical user data; and if the data of the same process is not stored in the original mirrored memory, migrate the data of the same process to the initial mirrored memory.

Optionally, the processor 430 is specifically configured to: determine a preplanned memory resource area to which the data to be stored in the mirrored memory belongs; and allocate, from unoccupied mirrored memory of the preplanned memory resource area to which the data belongs, the mirrored memory to the data to be stored in the mirrored memory.

Optionally, the processor 430 is further configured to: after the mirrored memory is allocated from the unoccupied mirrored memory to the data to be stored in the mirrored memory, set an occupancy flag for an address range of the mirrored memory that is allocated to the data to be stored in the mirrored memory.

A person of ordinary skill in the art may understand that all or some of the steps of the methods in the embodiments may be implemented by a program instructing relevant hardware (such as a processor). The program may be stored in a computer readable storage medium. The storage medium may include: a ROM, a RAM, a magnetic disk, or an optical disc.

The memory allocation method and apparatus provided by the embodiments of the present invention are described in detail above. The principles and implementation manners of the present invention are described herein through specific examples. The description about the embodiments is merely provided to help understand the methods and core ideas of the present invention. In addition, a person of ordinary skill in the art can make variations and modifications to the present invention in terms of the specific implementation manners and application scopes according to the ideas of the present invention. Therefore, the content of the specification shall not be construed as a limit to the present invention.

What is claimed is:

1. A memory allocation method performed by a computer device having a processor executing an operating system, comprising:
    obtaining memory information identifying one or more continuous memory address ranges configured as a mirrored memory;
    receiving process data from a process running on the computer device, wherein the process data includes a mirrored memory allocation identifier;
    writing the process data to a first portion of the mirrored memory in response to determining that the mirrored memory allocation identifier indicates that the process data is to be mirrored; and
    determining whether previous data generated previously by the process is stored in a non-mirrored memory; and
    migrating the previous data to the mirrored memory in response to determining that the previous data is stored in the non-mirrored memory.

2. The method according to claim 1, wherein obtaining the memory information identifying one or more continuous memory address ranges configured as the mirrored memory comprises obtaining the memory information from a basic input/output system (BIOS) of the computer device during an initialization of the operating system.

3. The method according to claim 1, wherein the process data includes a process descriptor of the process which includes the mirrored memory allocation identifier.

4. A computer device, comprising:
    a memory storing instructions and data, wherein the memory has one or more continuous memory address ranges configured as a mirrored memory; and
    a processor coupled to the memory and configured to read and execute the instructions stored in the memory to:
        obtain memory information identifying one or more continuous memory address ranges configured as a mirrored memory;
        receive process data from a process running on the computer device, wherein the process data includes a mirrored memory allocation identifier;
        write the process data to a first portion of the mirrored memory in response to determining that the mirrored memory allocation identifier indicates that the process data is to be mirrored; and
        determine whether previous data generated previously by the process is stored in a non-mirrored memory; and
        migrate the previous data to the mirrored memory in response to determining that the previous data is stored in the non-mirrored memory.

5. The computer device according to claim 4, further comprising a basic input/output system (BIOS), wherein to obtain the memory information identifying the one or more continuous memory address ranges configured as the mirrored memory, the processor is further configured to obtain the memory information from the BIOS during an initialization of an operating system running on the computer device.

6. The computer device according to claim 4, wherein the process data includes a process descriptor of the process having the mirrored memory allocation identifier.

7. A non-transitory storage medium comprising instructions stored therein, which when executed by one or more processors, cause the one or more processors to:
    obtain memory information identifying one or more continuous memory address ranges configured as a mirrored memory;
    receive process data from a process running on the computer device, wherein the process data includes a mirrored memory allocation identifier;
    write the process data to a first portion of the mirrored memory in response to determining that the mirrored memory allocation identifier indicates that the process data is to be mirrored; and
    determine whether previous data generated previously by the process is stored in a non-mirrored memory; and
    migrate the previous data to the mirrored memory in response to determining that the previous data is stored in the non-mirrored memory.

8. The non-transitory storage medium according to claim 7, wherein to obtain the memory information identifying one or more continuous memory address ranges configured as the mirrored memory, the one or more processors are to obtain the memory information from a basic input/output system (BIOS) of the computer device during an initialization of the operating system.

9. The non-transitory storage medium according to claim 7, wherein the process data includes a process descriptor of the process having the mirrored memory allocation identifier.

* * * * *